(12) United States Patent
Sakai (10) Patent No.: US 10,122,317 B2
(45) Date of Patent: Nov. 6, 2018

(54) ELECTRIC COMPRESSOR FOR VEHICLE

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/304,614

(22) PCT Filed: Jul. 20, 2015

(86) PCT No.: PCT/JP2015/003632
§ 371 (c)(1),
(2) Date: Oct. 17, 2016

(87) PCT Pub. No.: WO2016/017106
PCT Pub. Date: Feb. 4, 2016

(65) Prior Publication Data
US 2017/0040925 A1    Feb. 9, 2017

(30) Foreign Application Priority Data

Aug. 1, 2014 (JP) ................................. 2014-157360

(51) Int. Cl.
| F04B 35/04 | (2006.01) |
| H02P 29/40 | (2016.01) |
| F04B 39/00 | (2006.01) |
| F04B 49/10 | (2006.01) |
| H02P 27/06 | (2006.01) |
| B60H 1/32 | (2006.01) |
| F04B 49/06 | (2006.01) |

(52) U.S. Cl.
CPC ........... *H02P 29/40* (2016.02); *B60H 1/3222* (2013.01); *F04B 35/04* (2013.01); *F04B 39/00* (2013.01); *F04B 49/06* (2013.01); *F04B 49/065* (2013.01); *F04B 49/10* (2013.01); *H02P 27/06* (2013.01)

(58) Field of Classification Search
CPC .......... F04B 35/04; F04B 39/00; F04B 49/06; F04B 49/065; F04B 49/10; H02P 27/06; H02P 29/40
See application file for complete search history.

(56) References Cited

U.S. PATENT DOCUMENTS

| 2010/0315024 A1* | 12/2010 | Najima | ............. H02M 7/53871 318/139 |
| 2011/0210687 A1 | 9/2011 | Tsuji et al. | |
| 2013/0015802 A1* | 1/2013 | Hirose | ...................... B60L 3/00 318/488 |

FOREIGN PATENT DOCUMENTS

| JP | 2010183676 A | 8/2010 |
| JP | 2011200105 A | 10/2011 |
| JP | 2015019561 A | 1/2015 |

* cited by examiner

*Primary Examiner* — Muhammad S Islam
(74) *Attorney, Agent, or Firm* — Harness, Dickey & Pierce, P.L.C.

(57) ABSTRACT

An electric compressor for a vehicle includes: an electric motor having a coil; an inverter device for the electric motor; a capacitor that stores energy smaller than coil energy, is connected to an input end of the inverter device, and accumulates a charge according to an operation of the electric motor; a voltage detection device for the capacitor; an abnormality determination device that determines an abnormality based on the voltage of the capacitor; and a control device that performs a reflux mode in which the inverter device is controlled to flow back a current to the coil of the electric motor in case of abnormality.

9 Claims, 8 Drawing Sheets

ELECTRIC COMPRESSOR FOR VEHICLE

CROSS REFERENCE TO RELATED APPLICATIONS

This application is a U.S. National Phase Application under 35 U.S.C. 371 of International Application No. PCT/JP2015/003632 filed on Jul. 20, 2015 and published in Japanese as WO 2016/017106 A1 on Feb. 4, 2016. This application is based on and claims the benefit of priority from Japanese Patent Application No. 2014-157360 filed on Aug. 1, 2014. The entire disclosures of all of the above applications are incorporated herein by reference.

TECHNICAL FIELD

The present disclosure relates to an electric compressor for vehicle configured to secure safety of a vehicle after a vehicle collision.

BACKGROUND ART

A control device configured to secure the safety of a vehicle at a vehicle collision by controlling an electric motor to step out is proposed in, for example, Patent Literature 1. More specifically, upon detection of a vehicle collision, the control device sets a command value for an inverter to an operating frequency at which the electric motor cannot be driven. Consequently, the control device discharges high-voltage charges accumulated in a capacitor connected to an input side of the inverter by a switching loss of the inverter while restricting generation of a torque in the electric motor.

According to the technique in the related art as above, however, when a capacitance of the capacitor is small for energy of the electric motor, energy stored in the electric motor at an onset of a collision is regenerated and charged to the capacitor. A voltage exceeding a breakdown voltage is thus applied to the capacitor. Such a voltage application raises a problem that the capacitor breaks before a discharge of the capacitor is completed. Once the capacitor breaks, a discharge is no longer feasible.

PRIOR ART LITERATURES

Patent Literature

Patent Literature 1: JP-A-2010-183676

SUMMARY OF INVENTION

It is an object of the present disclosure to provide an electric compressor for vehicle capable of discharging high-voltage charges from a capacitor without a voltage across a capacitor exceeding a breakdown voltage at an onset of a vehicle collision in a configuration in which storable energy of a capacitor is smaller than storable energy of an electric motor.

According to an aspect of the present disclosure, an electric compressor for a vehicle includes: an electric motor having a coil; an inverter device that drives the electric motor; a capacitor that stores energy smaller than energy to be stored in the coil of the electric motor, is connected to an input end of the inverter device, and accumulates a charge according to an operation of the electric motor; a voltage detection device that detects a voltage of the capacitor; an abnormality determination device that determines an abnormality based on the voltage detected by the voltage detection device; and a control device that performs a reflux mode in which the inverter device is controlled to flow back a current to the coil of the electric motor when the abnormality determination device determines the abnormality while the electric motor is in operation.

According to the electric compressor for vehicle configured as above, energy of the electric motor is not regenerated to the capacitor at an onset of an abnormality of the vehicle. Hence, a rise in a voltage across the capacitor due to regenerative power from the electric motor to the capacitor can be restricted. Consequently, in a configuration in which a capacitance of the capacitor is not large enough for energy used in the electric motor, high-voltage charges in the capacitor can be discharged without a voltage across the capacitor exceeding a breakdown voltage at an onset of a vehicle collision.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Hereinafter, a first embodiment of the present disclosure will be described with reference to the drawings. An electric compressor for vehicle of the present embodiment is applied to, for example, an electric bicycle provided with a high-voltage battery.

Figure 1:
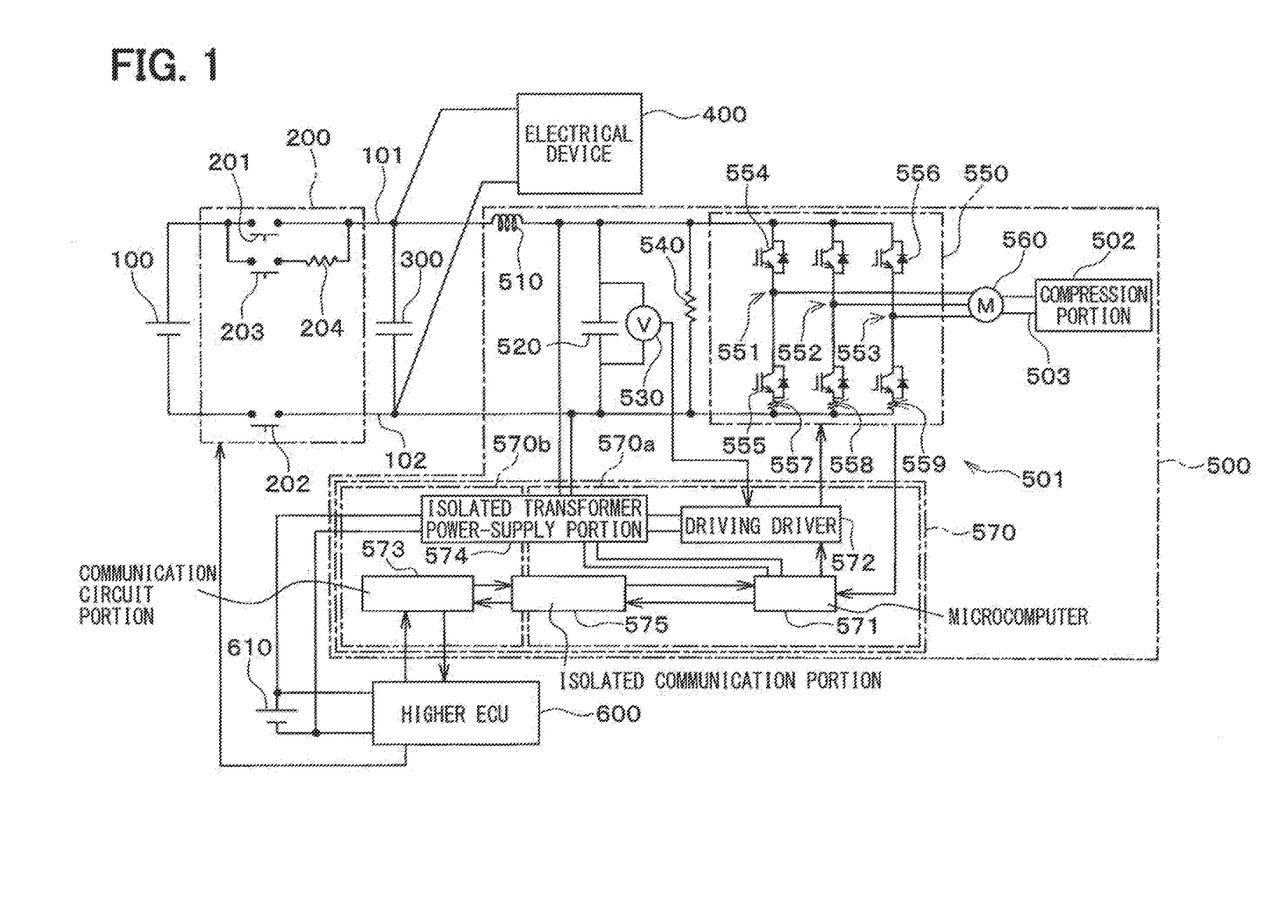
FIG. 1 is a circuit diagram of an entire system according to a first embodiment of the present disclosure.

As is shown in FIG. 1, a system of the present embodiment includes a high-voltage battery 100, a system main relay 200, a smoothing capacitor 300, an electrical device 400, an electric compressor 500, and a higher ECU (Electrical Control Unit) 600. In FIG. 1, paths indicated by arrows represent either signal lines or power lines.

The high-voltage battery 100 is a DC power supply to drive a high-voltage compressing device, such as the high-voltage compressor 500. A voltage generated by the high-voltage battery 100 varies from vehicle to vehicle. In the present embodiment, the high-voltage battery 100 generates a voltage of, for example, about 300 V.

The system main relay 200 is furnished with a function of preventing a rush current from flowing into the electric compressor 500 when a high voltage is applied to the electric compressor 500. To achieve such a function, the system main relay 200 has a switch 201 connected to a positive electrode of the high-voltage battery 100 and a switch 202 connected to a negative electrode of the high-voltage battery 100.

Also, the system main relay 200 has a switch 203 and a resistor 204. A serial connection of the switch 203 and the resistor 204 is connected to the switch 201 in parallel. For example, when an abnormal state of the system is detected by the higher ECU 600, the respective switches 201 through 203 are cut off by the higher ECU 600.

The smoothing capacitor 300 is a capacitor which electrically charges in a high-voltage range of a voltage applied from the high-voltage battery 100 and electrically discharges in a low-voltage range of the voltage applied from the high-voltage battery 100. Accordingly, the smoothing capacitor 300 serves to smoothen a voltage to be applied to the electrical device 400 and the electric compressor 500. In the manner as above, the smoothing capacitor 300 exerts a smoothing effect for both of the electrical device 400 and the electric compressor 500. The smoothing capacitor 300 is connected to link a positive-electrode bus 101 and a negative-electrode bus 102.

The electrical device 400 is a separate device branched from a vicinity of the smoothing capacitor 300. The electrical device 400 is, for example, a vehicle running invertor, a step-down DC-to-DC converter, or a high-voltage heater.

The electric compressor 500 is made up of a drive device 501 and a compression portion 502. The drive device 501 is a drive device to drive the compression portion 502 installed to the vehicle. The drive device 501 includes a coil 510, a smoothing capacitor 520, a voltage detection portion 530, a discharge resistor 540, an inverter device 550, an electric motor 560, and a control circuit portion 570.

The coil 510 is a coil component generated depending on a length of the wire between where the smoothing capacitor 300 is connected and where the smoothing capacitor 520 is connected. A normal coil, a common coil, or the like may be used instead.

Storable energy of the smoothing capacitor 520 is smaller than energy storable in coils of the electric motor 560. The smoothing capacitor 520 is connected to an input end of the inverter device 550. The smoothing capacitor 520 accumulates charges according to an operation of the electric compressor 500. The smoothing capacitor 520 configured as above together with the coil 510 serves to protect the inverter device 550 by absorbing a surge voltage inputted into the drive device 501 from the high-voltage battery 100.

The voltage detection portion 530 detects a voltage across the smoothing capacitor 520 and is connected to the smoothing capacitor 520 in parallel. The voltage detection portion 530 outputs a detection result to the control circuit portion 570. The discharge resistor 540 is a part which consumes power by converting power into heat when a current is passed through. The discharge resistor 540 is connected to the smoothing capacitor 520 in parallel.

The inverter device 550 is a circuit portion configured to convert a DC voltage of the high-voltage battery 100 to an AC voltage and driving the high-voltage electric motor 560 by generating an AC voltage and an AC current in three phases, namely, a phase U, a phase V, and a phase W. The inverter device 550 includes a U-phase arm 551, a V-phase arm 552, a W-phase arm 553, and shunt resistors 557 through 559. The respective arms 551 through 553 are connected in parallel between the positive-electrode bus 101 and the negative-electrode bus 102.

Each of the arms 551 through 553 is made up of two switching elements 554 and 555 connected in series. The first switching element 554 is connected to the positive-electrode bus 101. The second switching electrode 555 is connected between the first switching element 554 and the negative-electrode bus 102 while a portion connected to the first switching element 554 is connected to the electric motor 560.

A diode element 556 passing a current from an emitter side to a collector side is connected between a collector and an emitter in each of the switching elements 554 and 555. An intermediate point between the switching elements 544 and 555 in each set is connected to a phase end of a corresponding phase coil of the electric motor 560. The respective switching elements 554 and 555 are, for example, IGBTs (Insulated Gate Bipolar transistors) and the respective diode elements 556 are FWDs (Free Wheeling Diodes).

The shunt resistors 557 through 559 are elements to detect currents flowing through the corresponding coils of the electric motor 560. The shunt resistor 557 is provided to the U-phase arm 551. The shunt resistor 558 is provided to the V-phase arm 552. The shunt resistor 559 is provided to the W-phase arm 553. The inverter device 550 detects currents flowing through the respective shunt resistors 557 through 559 and outputs a detection result to the control circuit portion 570 and, more specifically, to a microcomputer 571 (described below) of the control circuit portion.

The electric motor 560 is a high-voltage motor having unillustrated three coils in the phase U, the phase V, and the phase W, and formed by commonly connecting one end of each coil to a middle point. In short, the electric motor 560 is configured to run on a three-phase AC voltage. The other end of the U-phase coil of the electric motor 560 is connected to the intermediate point between the switching elements 554 and 555 of the U-phase arm 551 of the inverter device 550. The same applies to the V-phase coil and the W-phase coil. Accordingly, the electric motor 560 runs on three-phase power supplied from the inverter device 550.

The control circuit portion 570 is a circuit portion which actuates the respective switching elements 554 and 555 of the inverter device 550 according to a command and a request from the higher ECU 600. The control circuit portion 570 includes a microcomputer 571, a driving driver 572, a communication circuit portion 573, an isolated transformer power-supply portion 574, and an isolated communication portion 575.

The microcomputer 571 is furnished with functions of communicating with the higher ECU 600, outputting a drive signal to the inverter device 550, inputting various detection signals after analog to digital conversion, and so on. For example, the microcomputer 571 monitors an input voltage to the inverter device 550 using the voltage detection portion 530 and drives the inverter device 550 for the electric motor 560 to output a predetermined torque.

The driving driver 572 generates a switching signal to actuate the respective switching elements 554 and 555 of the inverter device 550 according to a drive signal from the microcomputer 571.

The communication circuit portion 573 is a circuit to enable communications between the microcomputer 571 and the higher ECU 600. The communication circuit portion 573 is compatible with communication methods, such as a serial communication, a LIN communication, and a CAN communication.

The isolated transformer power-supply portion 574 generates a power supply to actuate the driving driver 572 and the microcomputer 571. More specifically, the isolated transformer power-supply portion 574 generates a power supply of the control circuit portion 570 by inputting a high voltage from the positive-electrode bus 101 and the negative-electrode bus 102. Alternatively, the isolated transformer power-supply portion 574 generates a power supply of the control circuit portion 570 by inputting a low voltage from a low-voltage power supply 610. The isolated transformer power-supply portion 574 can be, for example, a voltage converting transformer.

The isolated communication portion 575 is an isolated communication device which enables communications by electrically isolating the communication circuit portion 573 from the microcomputer 571. The isolated communication portion 575 can be, for example, a photo-coupler or a semiconductor isolator.

The microcomputer 571, the driving driver 572, a part of the isolated transformer power-supply portion 574, and a part of the isolated communication portion 575 are disposed on a high voltage side and form a high-voltage control device 570a. On the other hand, the communication circuit portion 573, a part of the isolated transformer power-supply portion 574, and a part of the isolated communication portion 575 are disposed on a low voltage side and form a low-voltage control device 570b.

The control circuit portion 570 configured as above is furnished with a determination function of determining an abnormality on the basis of a voltage detected by the voltage detection portion 530. The control circuit portion 570 is also furnished with a function of performing a reflux mode in which a current is flowed back to the coils of the electric compressor 500 by controlling the inverter device 550 when an abnormality is determined by the abnormality determining function while the electric compressor 500 is in operation.

The control circuit portion 570 is further furnished with a function of lowering a charge voltage charged to the smoothing capacitor 300 and the smoothing capacitor 520 by a discharge in the event of a vehicle collision. In addition, the control circuit portion 570 is furnished with a function of lowering a charge voltage charged to the smoothing capacitor 520 provided to the drive device 501 to a predetermined voltage within a predetermined time. The function described last is a function for the control circuit portion 570 to control the inverter device 550 in such a manner that an input voltage of the inverter device 550 is below a predetermined voltage and as high as or higher than an lower-limit operating voltage at above which the control circuit portion 570 is operable with the aim of securing a power-supply voltage of the control circuit portion 570. Owing to the function, the control circuit portion 570 is allowed to control the electric compressor 500 even after a vehicle collision. Herein, "the predetermined voltage" is set to, for example, an upper-limit voltage up to which the safety of the vehicle is secured.

The higher ECU 600 is an ECU, such as an engine ECU and an air-conditioning ECU installed to the vehicle. The higher ECU 600 is connected to the control circuit portion 570 of the electric compressor 500 via a communication line. The higher ECU 600 exchanges information necessary for an engine control and an air-conditioning control with the control circuit portion 570. The higher ECU 600 becomes operable when a power supply is provided from the low-voltage power supply 610 at 12 V or a reasonably low voltage.

The compression portion 502 is a compression mechanism forming the electric compressor 500 and driven by the electric motor 560. The compression portion 502 is coupled to the electric motor 560 via a coupling portion 503. The compression mechanism is applied to, for example, a refrigeration cycle. The compression mechanism compresses, for example, a refrigerant when driven by the electric motor 560. The above has described an overall configuration of the system including the electric compressor 500 of the present embodiment.

Figure 2:
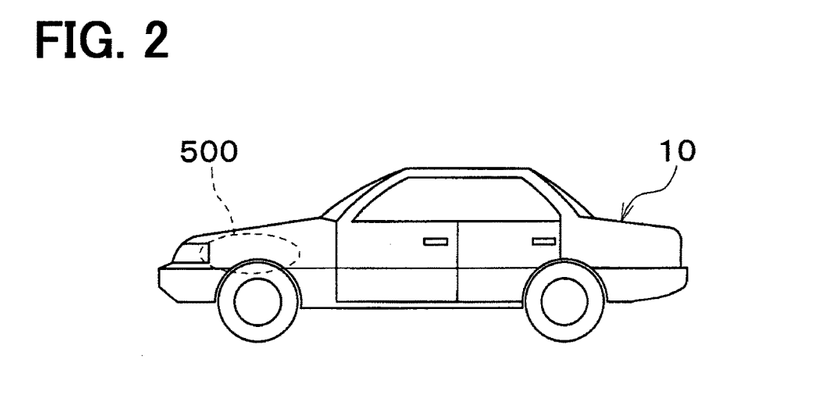
FIG. 2 is a view indicating a location in a vehicle where an electric compressor shown in FIG. 1 is installed.

Of the system shown in FIG. 1, the electric compressor 500 is installed inside a hood of a vehicle 10 as shown in FIG. 2. Hence, the electric compressor 500 is installed on a front side of the vehicle 10 in some cases and a harness supplying power to the electric compressor 500 may possibly be disconnected in the event of a vehicle collision. In such a case, high-voltage charges accumulated in the smoothing capacitor 520 have to be discharged in order to secure the safety.

Figure 3:
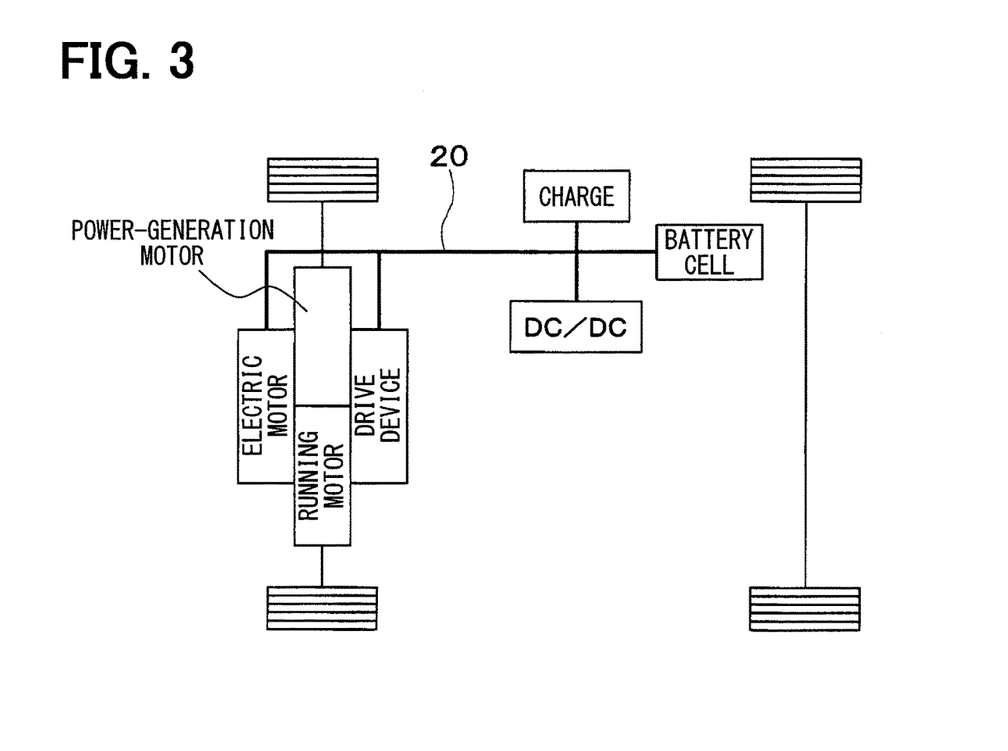
FIG. 3 is a schematic view when a high-voltage wire is routed in the vehicle.

As is shown in FIG. 3, a high-voltage wire 20 is routed in the vehicle 10. FIG. 3 is a top view of the vehicle 10 when viewed from a vehicle ceiling side. Besides the electric compressor 500 described above, a running motor and a power-generation motor are also installed to the vehicle 10. In addition, drive devices driving the motors are also installed. The high-voltage wire 20 is connected to a charge portion charged to 100 V to 200 V, a battery cell of about 300 V to 400 V, a DC-to-DC converter for voltage conversion, and so on. For example, when a collision occurs in a front part on a right side of the vehicle 10, a disconnection of the high-voltage wire 20 is highly likely to occur.

Figure 4:
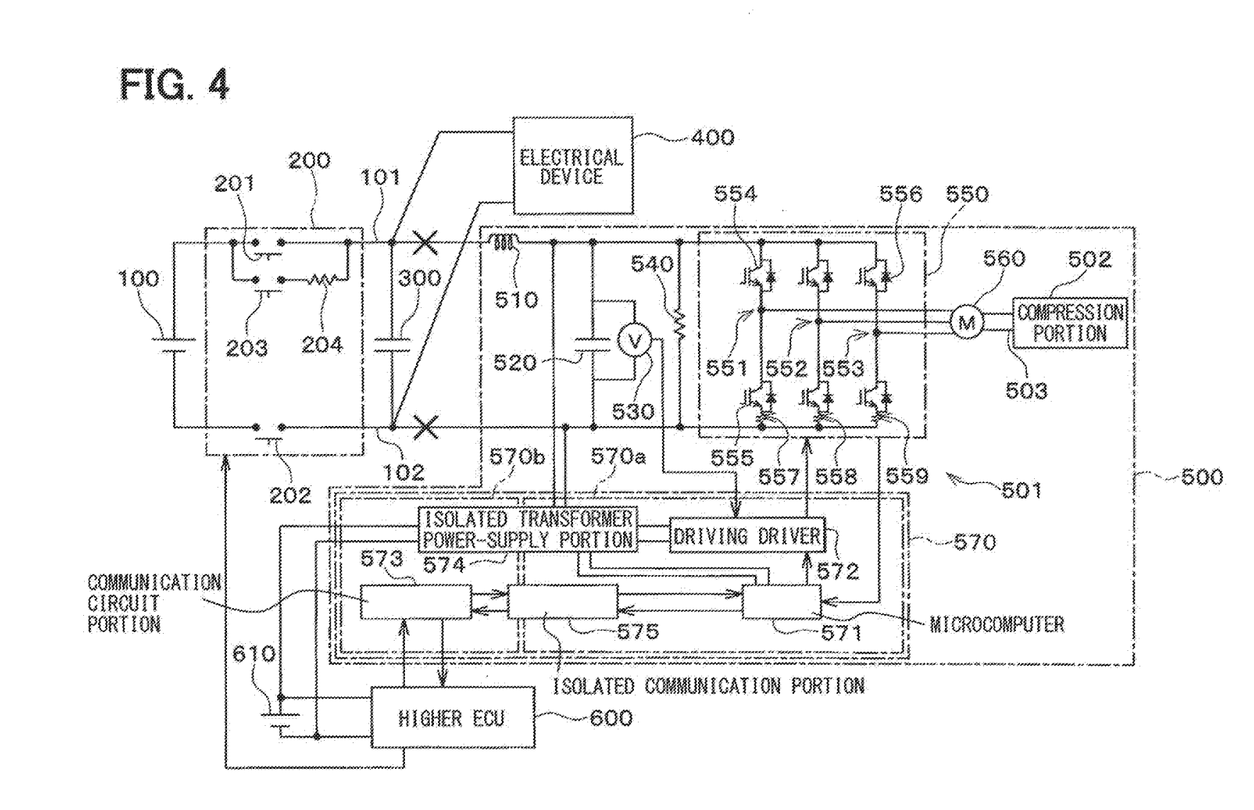
FIG. 4 is a view showing a case where the wire is disconnected in the system shown in FIG. 1.

More specifically, as is shown in FIG. 4, the high-voltage wire 20, that is, the positive-electrode bus 101 and the negative-electrode bus 102 may probably be disconnected in the event of a vehicle collision. In FIG. 4, a mark "X" indicates where each bus is disconnected. Hence, the control circuit portion 570 performs a discharge control on the smoothing capacitor 520 according to a control content depicted in FIG. 5. A flowchart shown in FIG. 5 starts when a power supply is provided to the control circuit portion 570 and a computation is performed repetitively afterward. Also, the flowchart is called and performed in control cycles.

Figure 5:
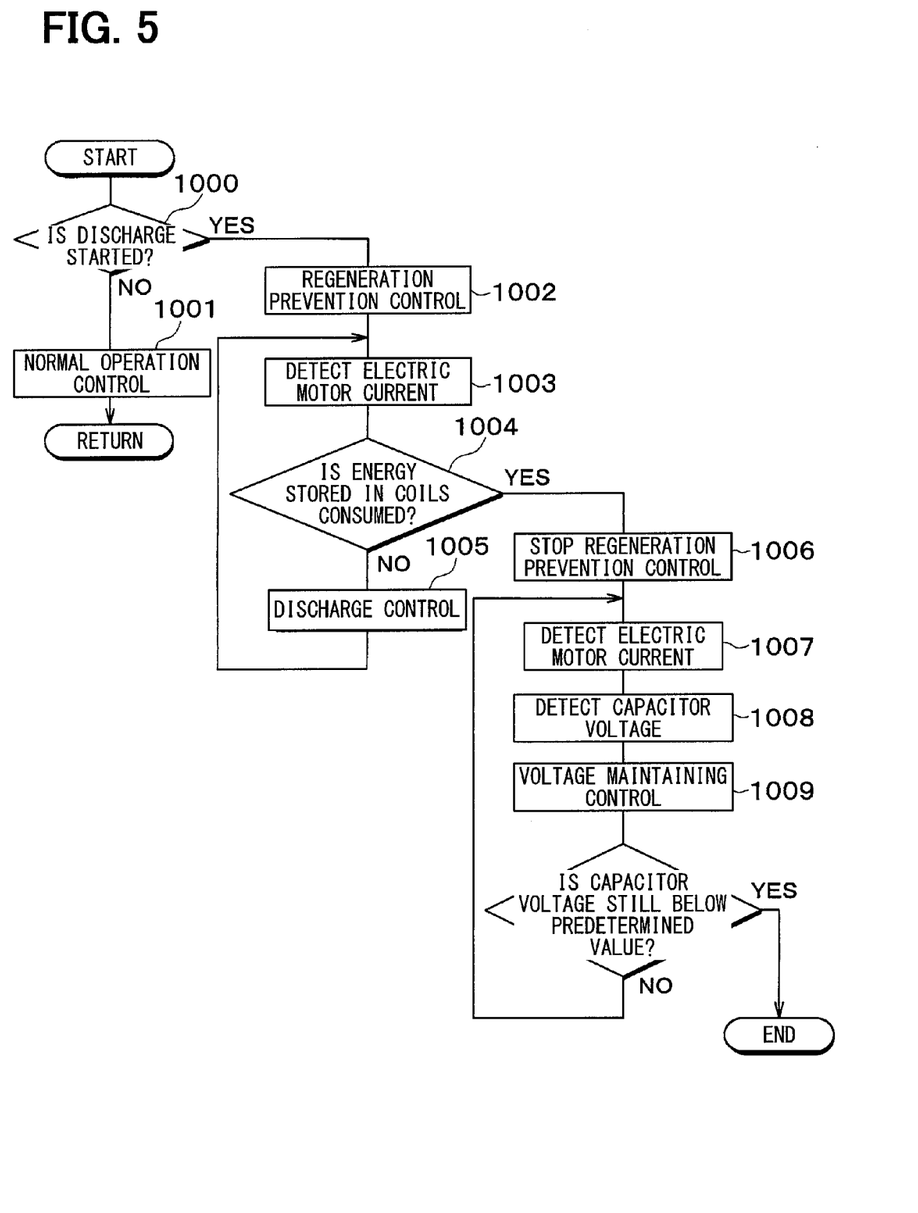
FIG. 5 is a flowchart depicting a control content of a control circuit portion.

A case where a collision of the vehicle 10 is absent will be described first. In Step 1000, whether a discharge is started is determined. When a voltage across the smoothing capacitor 520 is as high as or higher than a predetermined voltage, it is determined that a discharge is not started and advancement is made to Step 1001. The predetermined voltage is, for example, 100 V. Herein, a start of the discharge is not determined when a power supply is provided to the electric compressor 500.

In Step 1001, a normal operation control is performed. Subsequently, the flow returns to Step 1000 and whether a discharge is started is determined. Step 1000 and Step 1001 are repeated unless a collision of the vehicle 10 occurs. Step 1001 can be said as a device detecting an abnormality of the vehicle 10.

On the other hand, in the event of a collision of the vehicle 10, it is determined in Step 1000 that a voltage across the smoothing capacitor 520 is below the predetermined voltage and also a discharge is started. Herein, advancement is made to Step 1002.

In Step 1002, a regeneration prevention control is performed. The regeneration prevention control is a control by which the three first switching elements 554 forming upper arms of the inverter device 550 are switched OFF and the three second switching elements 555 forming lower arms are switched ON. When the inverter device 550 is controlled as above, the inverter device 550 shifts to the reflux mode in which a current flowing from the electric motor 560 to the inverter device 550 flows back again to the coils of the electric motor 560.

In subsequent Step 1003, a current flowing through the electric motor 560 is detected. In subsequent Step 1004, whether energy stored in the coils of the electric motor 560 is consumed is determined on the basis of the detected current. Energy stored in the coils may be determined by using the detected current or energy of the coils may be found in accordance with a calculating formula: $(½)×LI^2$, where L is inductance of the coils and I is the detected current.

When it is determined in Step 1004 that energy stored in the coils of the electric motor 560 is not consumed to a predetermined value or more, advancement is made to Step 1005. The predetermined value for the determination on energy consumption varies with specifications of the electric motor 560. For example, the predetermined value is 2 Arms in the case of a current and 1 mJ in the case of energy.

In Step 1005, a discharge control is performed. The discharge control is performed by, for example, increasing consumption of a current by a discharge due to an operation of the high-voltage control device 570a operating with a supply of power from the smoothing capacitor 520, a discharge by the discharge resistor 540 connected to the smoothing capacitor 520 in parallel, or changing operation conditions of the high-voltage control device 570a.

On the other hand, when it is determined in Step 1005 that energy stored in the coils of the electric motor 560 is consumed to the predetermined value or more, advancement is made to Step 1006. In Step 1006, the regeneration prevention control started in Step 1002 is stopped.

In subsequent Step 1007, a current flowing through the coils of the electric motor 560 is detected in the same manner as in Step 1003. In Step 1008, a voltage across the smoothing capacitor 520 is detected. In Step 1009, a voltage maintaining control is performed for the smoothing capacitor 520. That is to say, when a current detection result after the reflux mode is performed reveals that the current is reduced to a predetermined current value or below, the voltage maintaining control is performed, by which a voltage across the smoothing capacitor 520 is maintained within a predetermined voltage range by an operation of the inverter device 550.

The voltage maintaining control is performed by switching ON and OFF the switching elements 554 and 555 of the inverter device 550. More specifically, a voltage across the smoothing capacitor 520 is maintained within the predetermined voltage range as the inverter device 550 is controlled to run the electric motor 560 phase by phase. For example, a current flows in the phase U and then in the phase V and the current flows next in the W phase and again in the phase U. Owing to the control as above, an operation balance of the inverter device 550 becomes satisfactory when substantially no current is flowing through the electric motor 560. Hence, intensive heat generation in the inverter device 550 can be restricted.

In subsequent Step 1010, whether a voltage across the smoothing capacitor 520 is still below the predetermined value is determined. When it is determined that a voltage across the smoothing capacitor 520 does not remain below the predetermine value, that is, when it is determined that a voltage across the smoothing capacitor 520 is as high as or higher than the predetermined value, the flow returns to Step 1007 to continue the voltage maintaining control. On the other hand, when it is determined that a voltage across the smoothing capacitor 520 is below the predetermined value, the voltage maintaining control is stopped and the flow is ended.

The predetermined value in Step 1010 is, for example, 30 V. Besides a determination on the basis of the predetermined value of a voltage across the smoothing capacitor 520, the voltage maintaining control may be ended in Step 1010 when a predetermined time has elapsed.

Figure 6:
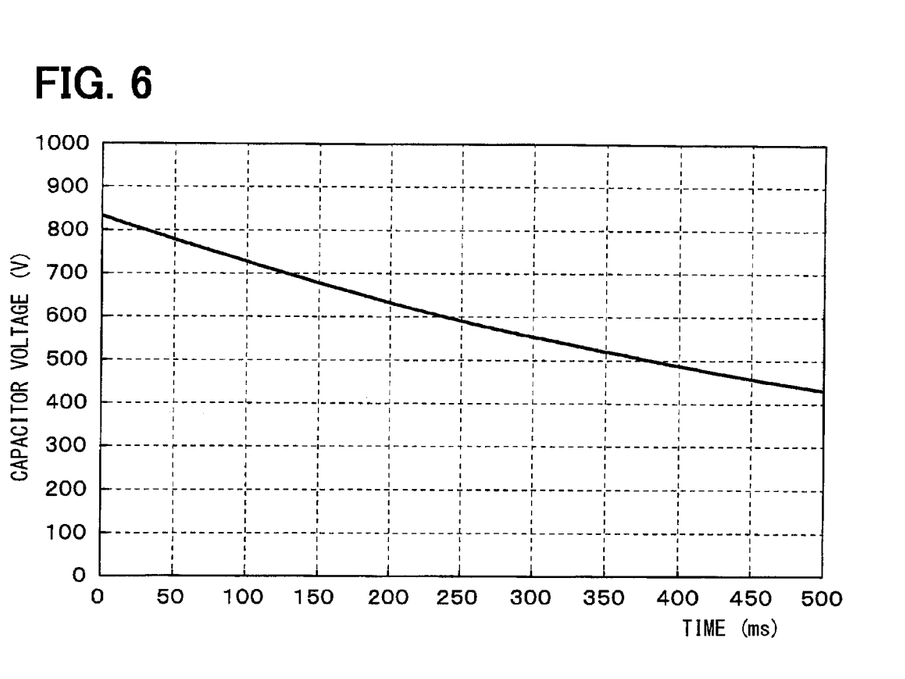
FIG. 6 is a view showing a variance of a voltage across a smoothing capacitor when the control depicted in FIG. 5 is not performed.

The inventors simulated a case where the controls as above were performed and a case where the controls as above were not performed to check a difference of effects. A result will now be described. In a case where the controls as above are not performed, as is shown in FIG. 6, a voltage across the smoothing capacitor 520 rises abruptly after a collision of the vehicle 10 and subsequently falls due to a discharge. In particular, as is shown in FIG. 7, it is understood that a voltage across the smoothing capacitor 520 rises abruptly within a period as short as 0.05 ms after a collision of the vehicle 10.

Figure 7:
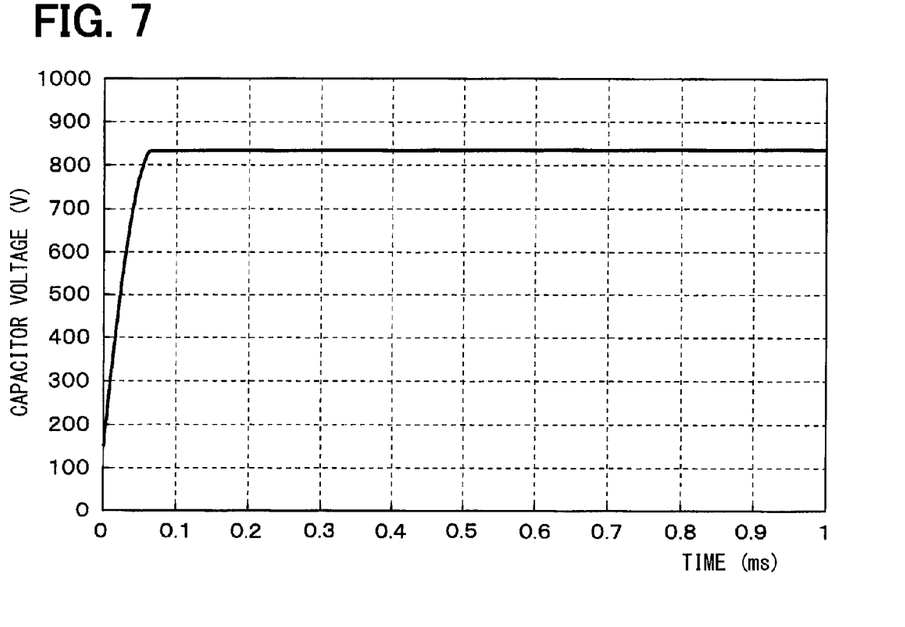
FIG. 7 is an enlarged view of FIG. 6 during a period from 0 ms to 1 ms.

In a case where the phenomenon as in FIG. 7 occurs, given that a voltage across the high-voltage battery 100 is 300 V and a current flowing through the electric motor 560 is 18 Arms, then examples of capacitances of the coils of the electric motor 560 and the smoothing capacitor 520 are about 0.7 mH (0.34 J for three phases) for the coils of the electric motor 560 and about 2 μF (0.09 J) for the smoothing capacitor 520. Because storable energy of the coils of the electric motor 560 is large for storable energy of the smoothing capacitor 520, a capacitor voltage rises markedly when a current flows from the coils to the smoothing capacitor 520.

Figure 8:
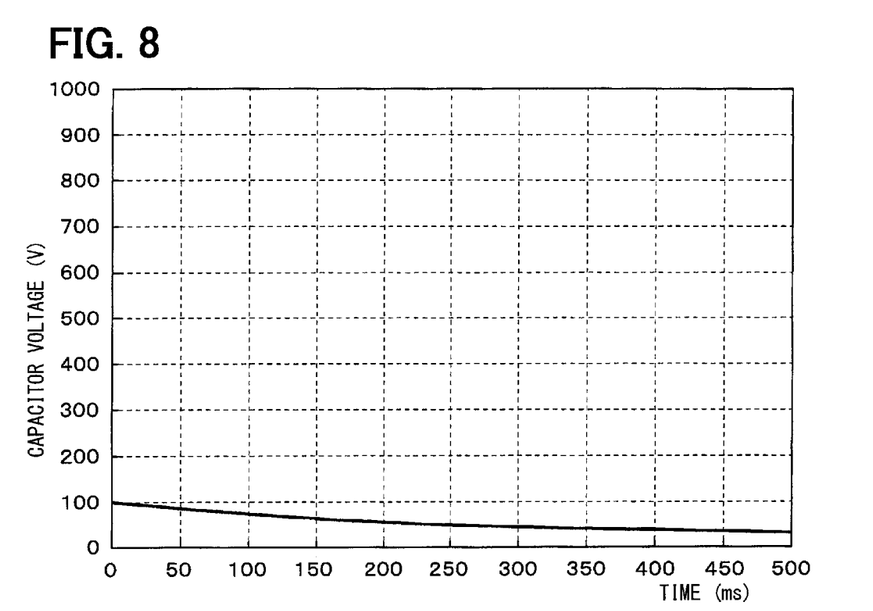
FIG. 8 is a view showing a variance of a voltage across the smoothing capacitor when the control depicted in FIG. 5 is performed.
Figure 9:
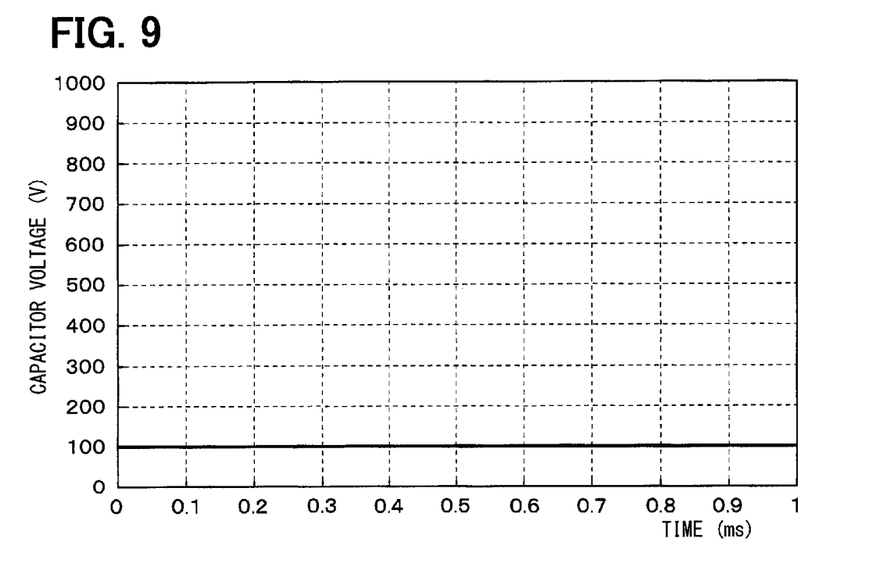
FIG. 9 is an enlarged view of FIG. 8 during a period from 0 ms to 1 ms.

In contrast, in a case where the controls as above are performed, as is shown in FIG. 8, a voltage across the smoothing capacitor 520 starts to fall by a discharge without rising. As is shown in FIG. 9, it is understood that a voltage across the smoothing capacitor 520 does not rise at all after a collision of the vehicle 10.

As has been described above, in the present embodiment, by performing the controls not to regenerate energy of the electric motor 560 to the smoothing capacitor 520 at a vehicle collision, a rise in a voltage across the smoothing capacitor 520 due to regenerative power from the electric compressor 500 to the smoothing capacitor 520 can be restricted. Consequently, the smoothing capacitor 520 can be discharged without a voltage across the smoothing capacitor 520 rising abruptly to exceed a breakdown voltage due to a wire disconnection at a vehicle collision. In addition, because the smoothing capacitor 520 can be discharged without a rise in a voltage across the smoothing capacitor 520, a discharge time of the smoothing capacitor 520 can be shorter.

The smoothing capacitor 520 corresponds to "a capacitor" and the voltage detection portion 530 corresponds to "a voltage detection device". Also, the abnormality determination function furnished to the control circuit portion 570 corresponds to "an abnormality determination device" and the control circuit portion 570 corresponds to "a control device". Further, the shunt resistors 557 through 559 and the inverter device 550 correspond to "a current detection device".

Second Embodiment

Figure 10:
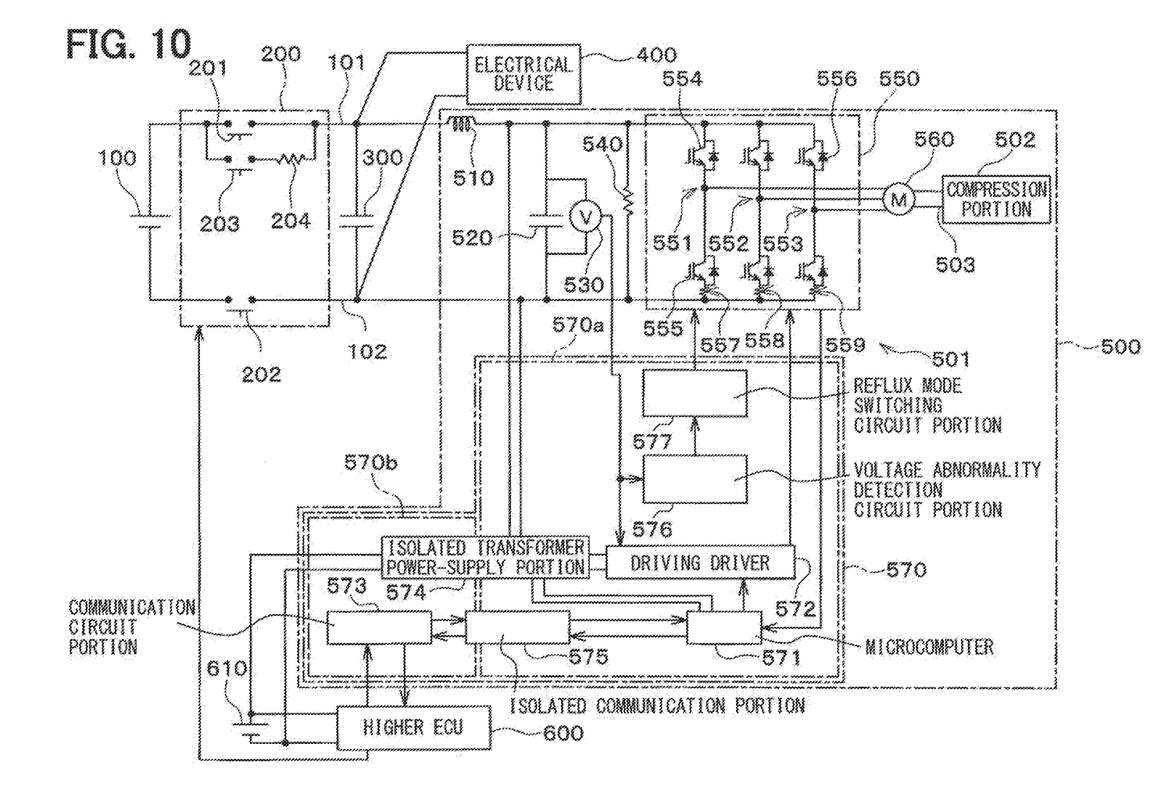
FIG. 10 is a circuit diagram of an entire system according to a second embodiment of the present disclosure.

The present embodiment will describe a difference from the first embodiment above. As is shown in FIG. 10, a control circuit portion 570 has a voltage abnormality detection portion 576 and a reflux mode switching circuit portion 577.

The voltage abnormality detection portion 576 is configured to determine an abnormality on the basis of a variance of a voltage across a smoothing capacitor 520 at a falling rate as high as or higher than a predetermined rate value. In short, the voltage abnormality detection portion 576 is used as the abnormality determination device in Step 1001 described above.

Also, the reflux mode switching circuit portion 577 is configured to shift an inverter device 550 to a reflux mode when the voltage abnormality detection portion 576 determines an abnormality. In short, the reflux mode switching circuit portion 577 is used for the regeneration prevention control in Step 1002 described above.

A voltage across the smoothing capacitor 520 rises due to regenerative power quite fast for a switching frequency of the inverter device 550. Hence, shifting to Step 1002 (reflux mode) can take place faster than an abnormality signal of a collision or a communication error. In short, the reflux mode can be performed independently of the switching frequency of the inverter device 550.

It goes without saying that an abnormality may be determined using, for example, an OR circuit on the grounds that a voltage across the smoothing capacitor 520 falls below a predetermined voltage and the voltage varies at a falling rate as high as or higher than the predetermined rate value.

The voltage abnormality detection portion 576 corresponds to "an abnormality determination device" and the reflux mode switching circuit portion 577 corresponds to "a reflux mode switching device".

Third Embodiment

Figure 11:
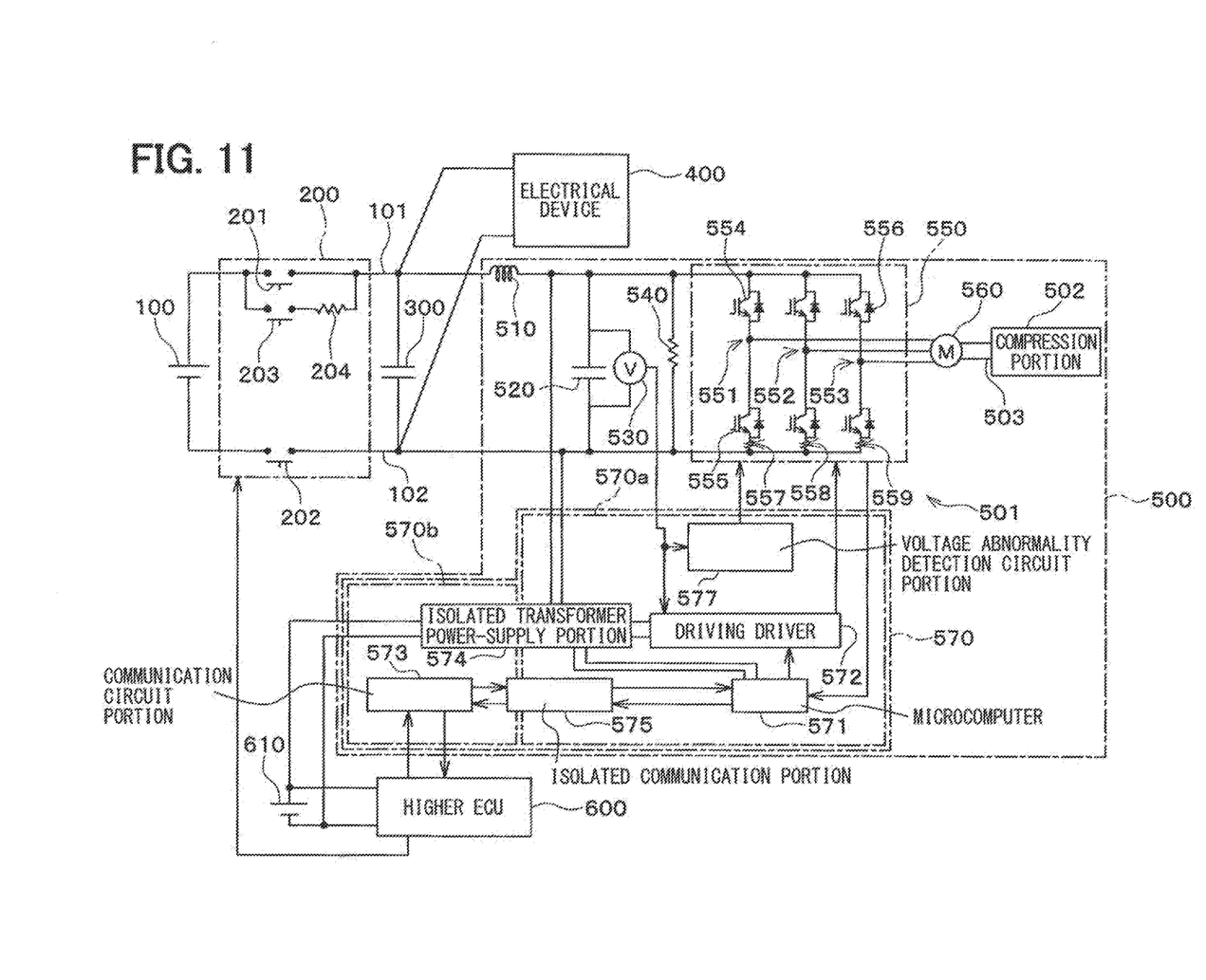
FIG. 11 is a circuit diagram of an entire system according to a third embodiment of the present disclosure.

The present embodiment will describe a difference from the second embodiment above. As is shown in FIG. 11, in contrast to the configuration described in the second embodiment above, a voltage abnormality detection portion 576 is omitted and a reflux mode switching circuit portion 577 alone is provided to a control circuit portion 570 in the present embodiment.

The reflux mode switching circuit portion 577 of the present embodiment has an unillustrated comparator. Hence, the reflux mode switching circuit portion 577 determines presence or absence of an abnormality by comparing a detection result by a voltage detection portion 530 with a threshold using the comparator. When the determination result shows an abnormality, the reflux mode switching circuit portion 577 shifts the inverter device 550 to a reflux mode.

By providing the reflux mode switching control portion 577 to the control circuit portion 570 as above, a path and a time from a detection of a voltage across a smoothing capacitor 520 to a shifting to the reflux mode can be shorter. Because it is crucial to eliminate regeneration from an electric motor 560 to the smoothing capacitor 520 to the extent possible, the inverter device 550 can be shifted to the reflux mode without any delay.

The reflux mode switching circuit portion 577 corresponds to "an abnormality determination device" and "a reflux mode switching device".

Fourth Embodiment

The present embodiment will describe a difference from the first through third embodiments above. In the present embodiment, when a control circuit portion 570 becomes inoperable due to a collision of a vehicle 10, a normal switching signal is no longer inputted into an inverter device 550 from the control circuit portion 570. In short, the control circuit portion 570 does not output a command of a reflux mode at a collision of the vehicle 10.

In such a case, the inverter device 550 shifts to the reflux mode by switching first switching elements 554 normally OFF and switching second switching elements 555 normally ON. Consequently, even when the control circuit portion 570 becomes inoperable due to a vehicle collision, the inverter device 550 is capable of shifting to the reflux mode.

Fifth Embodiment

The present embodiment will describe a difference from the first through fourth embodiments above. In the present embodiment, a control circuit portion 570 determines a switching period of an inverter device 550 to make regenerative power (charge power) from an electric motor 560 to a smoothing capacitor 520 equal to power consumption by the smoothing capacitor 520. Hence, the control circuit portion 570 controls the inverter device 550 by constantly calculating the regenerative power from the electric motor 560 to the smoothing capacitor 520 and the power consumption by the smoothing capacitor 520.

Owing to the control as above, the smoothing capacitor 520 is not discharged abruptly. Hence, a variation in a voltage across the smoothing capacitor 520 maintained within a predetermined voltage range can be restricted.

Sixth Embodiment

The present embodiment will describe a difference from the first through fifth embodiments above. In the present embodiment, a control circuit portion 570 maintains a voltage across a smoothing capacitor 520 within a predetermined voltage range using a phase having a smallest current among currents detected by shunt resistors 557 through 559. A voltage maintaining control can be also performed in the manner as above.

Other Embodiments

Configurations of the electric compressors 500 described in the respective embodiments above are mere examples. The present disclosure is not limited to the configurations described above and may be of other configurations as long as the present disclosure is realized. For example, the configurations of the electric compressors 500 shown in FIG. 1, FIG. 10, and FIG. 11 are mere examples and other configurations are also adoptable. In addition, the respective embodiments above may be combined appropriately to the extent possible.

It is noted that a flowchart or the processing of the flowchart in the present application includes sections (also referred to as steps), each of which is represented, for instance, as 1000. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition,

What is claimed is:

1. An electric compressor for a vehicle comprising:
an electric motor having a coil;
an inverter device that drives the electric motor;
a capacitor that stores energy smaller than energy to be stored in the coil of the electric motor, is connected to an input end of the inverter device, and accumulates a charge according to an operation of the electric motor;
a voltage detection device that detects a voltage of the capacitor;
an abnormality determination device that determines an abnormality based on the voltage detected by the voltage detection device;
a control device that performs a reflux mode in which the inverter device is controlled to flow back a current to the coil of the electric motor when the abnormality determination device determines the abnormality while the electric motor is in operation;
wherein, the control device performs a regeneration prevention control to control the inverter device to shift to the reflux mode in which a current flowing from the electric motor to the inverter device flows back to the coil of the electric motor when the abnormality determination device determines the abnormality while the electric motor is in operation;
wherein the control device performs the regeneration prevention control to prevent the capacitor from being charged by regenerative power; and
wherein the control device performs a discharge control, in addition to the regeneration prevention control, by discharging current from the capacitor to the control device, by discharging current from the capacitor to a discharge resistor connected in parallel to the capacitor, or by changing operation conditions of the control device.

2. The electric compressor for vehicle according to claim 1, wherein:
the abnormality determination device determines the abnormality based on a feature that a voltage of the capacitor falls below a predetermined voltage or the voltage of the capacitor varies at a falling rate equal to or higher than a predetermined rate.

3. The electric compressor for vehicle according to claim 1, wherein:
the control device includes a reflux mode switching device that shifts to the reflux mode when the abnormality determination device determines the abnormality.

4. The electric compressor for vehicle according to claim 1, wherein:
the inverter device includes:
a first switching element connected to a positive-electrode bus; and
a second switching element connected between the first switching element and a negative-electrode bus and having a connection portion to the first switching element, which is connected to the electric motor; and
the inverter device shifts to the reflux mode by switching the first switching element to a normally off operation and by switching the second switching element to a normally on operation when the control device does not output a command of the reflux mode.

5. An electric compressor for a vehicle comprising:
an electric motor having a coil;
an inverter device that drives the electric motor;
a capacitor that stores energy smaller than energy to be stored in the coil of the electric motor, is connected to an input end of the inverter device, and accumulates a charge according to an operation of the electric motor;
a voltage detection device that detects a voltage of the capacitor;
an abnormality determination device that determines an abnormality based on the voltage detected by the voltage detection device;
a control device that performs a reflux mode in which the inverter device is controlled to flow back a current to the coil of the electric motor when the abnormality determination device determines the abnormality while the electric motor is in operation; and
a current detection device that detects a current flowing through the electric motor, wherein:
the control device maintains a voltage of the capacitor within a predetermined voltage range by an operation of the inverter device when a detection result of the current detection device is reduced to or below a predetermined current value after the reflux mode is performed.

6. The electric compressor for vehicle according to claim 5, wherein:
the electric motor is configured to function on a three-phase alternating current voltage; and
the control device maintains the voltage of the capacitor within the predetermined voltage range by controlling the inverter device to function the electric motor phase by phase.

7. The electric compressor for vehicle according to claim 5, wherein:
the electric motor is configured to function on a three-phase alternating current voltage;
the current detection device detects a current flowing through the electric motor in each of three phases; and
the control device maintains the voltage of the capacitor within the predetermined voltage range using a phase having a smallest current among currents detected by the current detection device.

8. The electric compressor for vehicle according to claim 7, wherein:
the control device determines a switching period of the inverter device to set a regenerative power from the electric motor to the capacitor to be equal to a power consumption by the capacitor.

9. An electric compressor for a vehicle comprising:
an electric motor having a first-phase coil, a second-phase coil, and a third-phase coil;
an inverter device that drives the electric motor, the inverter device having a first-phase arm, a second-phase arm, and a third-phase arm, each of the first-phase arm, the second-phase arm, and the third-phase arm being connected between a positive-electrode bus and a negative electrode bus connected to a battery and each having an upper switching element and a lower switching element connected in series, the upper switching element being connected to the positive-electrode bus and the lower switching element being connected to the negative electrode bus, a first intermediate point between the upper switching element of the first-phase arm being connected to the first-phase coil of the electric motor, a second intermediate point between the upper switching element of the second-phase arm being connected to the second-phase coil of the electric motor, and a third intermediate point between the upper switching element of the third-phase arm being connected to the third-phase coil of the electric motor;

a capacitor that stores energy smaller than energy to be stored in the coils of the electric motor, is connected to an input end of the inverter device between the positive-electrode bus and the negative electrode bus, and accumulates a charge according to an operation of the electric motor;

a voltage detection device that detects a voltage of the capacitor;

an abnormality determination device that determines an abnormality based on the voltage detected by the voltage detection device;

a control device that performs a regeneration prevention control to control the inverter device to shift to a reflux mode by switching off the upper switching elements of the first-phase arm, the second-phase arm, and the third-phase arm and by switching on the lower switching elements of the first-phase arm the first-phase arm, the second-phase arm, and the third-phase arm so that current flowing from the electric motor to the inverter device flows back to the coils of the electric motor in response to the abnormality determination device determining the abnormality while the electric motor is in operation;

wherein the control device performs the regeneration prevention control to prevent the capacitor from being charged by regenerative power; and wherein the control device performs a discharge control, in addition to the regeneration prevention control, by discharging current from the capacitor to the control device, by discharging current from the capacitor to a discharge resistor connected in parallel to the capacitor, or by changing operation conditions of the control device.

* * * * *